(12) United States Patent
Fauteux et al.

(10) Patent No.: US 11,923,515 B2
(45) Date of Patent: Mar. 5, 2024

(54) BATTERY PACK, TOOL BATTERY AND BATTERY OPERATED TOOL

(71) Applicant: TECHTRONIC CORDLESS GP, Anderson, SC (US)

(72) Inventors: Denis Gaston Fauteux, Tsuen Wan (CN); Wing Keung Woo, Tsuen Wan (CN)

(73) Assignee: TECHTRONIC POWER TOOLS TECHNOLOGY LIMITED, Tortola (VG)

( * ) Notice: Subject to any disclaimer, the term of this patent is extended or adjusted under 35 U.S.C. 154(b) by 0 days.

(21) Appl. No.: 17/522,449

(22) Filed: Nov. 9, 2021

(65) Prior Publication Data

US 2022/0069366 A1 Mar. 3, 2022

Related U.S. Application Data

(63) Continuation of application No. 14/899,833, filed as application No. PCT/CN2014/080868 on Jun. 26, 2014, now abandoned.

(30) Foreign Application Priority Data

Jun. 26, 2013 (HK) ................................ 13107541.4
Jul. 3, 2013 (HK) ................................ 13107780.4

(51) Int. Cl.
*H01M 10/42* (2006.01)
*H01M 10/052* (2010.01)
(Continued)

(52) U.S. Cl.
CPC ....... *H01M 10/425* (2013.01); *H01M 10/052* (2013.01); *H01M 10/0565* (2013.01);
(Continued)

(58) Field of Classification Search
CPC .................................................. H01M 2220/30
See application file for complete search history.

(56) References Cited

U.S. PATENT DOCUMENTS

| 2001/0000238 A1 | 4/2001 | Urry |
| 2006/0096771 A1 | 5/2006 | Brotto |

(Continued)

FOREIGN PATENT DOCUMENTS

| CN | 202952236 U | 5/2013 |
| EP | 2003760 A2 | 12/2008 |
| JP | 2012164463 A | 8/2012 |

OTHER PUBLICATIONS

International Search Report and Written Opinion for Application No. PCT/CN2014/080868 dated Dec. 25, 2014 (9 pages).

*Primary Examiner* — Haroon S. Sheikh
(74) *Attorney, Agent, or Firm* — Michael Best & Friedrich LLP

(57) ABSTRACT

A lithium-polymer based battery pack for power a hand held power tool or a garden tool, the battery pack has a plurality of battery cells located within housing that is selectively connectable to and supportable by a hand held power tool or a garden tool. The battery cells have a lithium-polymer based chemistry and a nominal charged internal impedance of less than or equal to approximately 5 milliohms. In one embodiment the cells are think cells are stacked within the housing such that each sell is layered over or under an adjacent cell and a resiliently deformable substrate located between adjacent battery cells. In another embodiment the cells may be interconnected to have a combined output voltage of at least 9 volts and to produce a combined average discharge current of greater than 20 amps. A lithium-polymer tool battery and a battery powered tool are also part of the invention.

20 Claims, 8 Drawing Sheets

(51) Int. Cl.
*H01M 10/0565* (2010.01)
*H01M 10/48* (2006.01)
*H01M 10/6235* (2014.01)
*H01M 10/647* (2014.01)
*H01M 10/653* (2014.01)
*H01M 10/6555* (2014.01)
*H01M 50/105* (2021.01)
*H01M 50/211* (2021.01)
*H01M 50/24* (2021.01)
*H01M 50/51* (2021.01)
*H01M 50/557* (2021.01)

(52) U.S. Cl.
CPC ......... *H01M 10/48* (2013.01); *H01M 10/486* (2013.01); *H01M 10/6235* (2015.04); *H01M 10/647* (2015.04); *H01M 10/653* (2015.04); *H01M 10/6555* (2015.04); *H01M 50/105* (2021.01); *H01M 50/211* (2021.01); *H01M 50/24* (2021.01); *H01M 50/51* (2021.01); *H01M 50/557* (2021.01); *H01M 2220/30* (2013.01)

(56) References Cited

U.S. PATENT DOCUMENTS

| | | |
|---|---|---|
| 2006/0164032 A1 | 7/2006 | Johnson et al. |
| 2007/0146020 A1 | 6/2007 | Williams |
| 2008/0003505 A1 | 1/2008 | Wuensch et al. |
| 2008/0180059 A1 | 7/2008 | Carrier et al. |
| 2008/0211327 A1 | 9/2008 | Schlegel et al. |
| 2008/0309289 A1 | 12/2008 | White et al. |
| 2009/0297936 A1 | 12/2009 | Nemoto et al. |
| 2010/0129706 A1 | 5/2010 | Matthias |
| 2010/0218386 A1 | 9/2010 | Rosskamp et al. |
| 2011/0003185 A1 | 1/2011 | Kritzer |
| 2012/0009462 A1 | 1/2012 | Barter et al. |
| 2012/0301747 A1 | 11/2012 | Han et al. |
| 2013/0164567 A1* | 6/2013 | Olsson ................ H01M 50/224 429/93 |

* cited by examiner

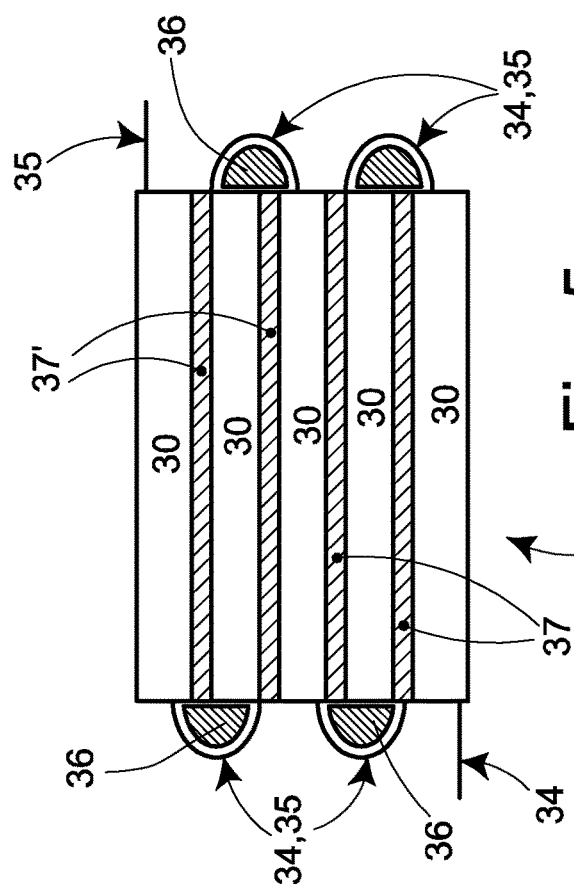
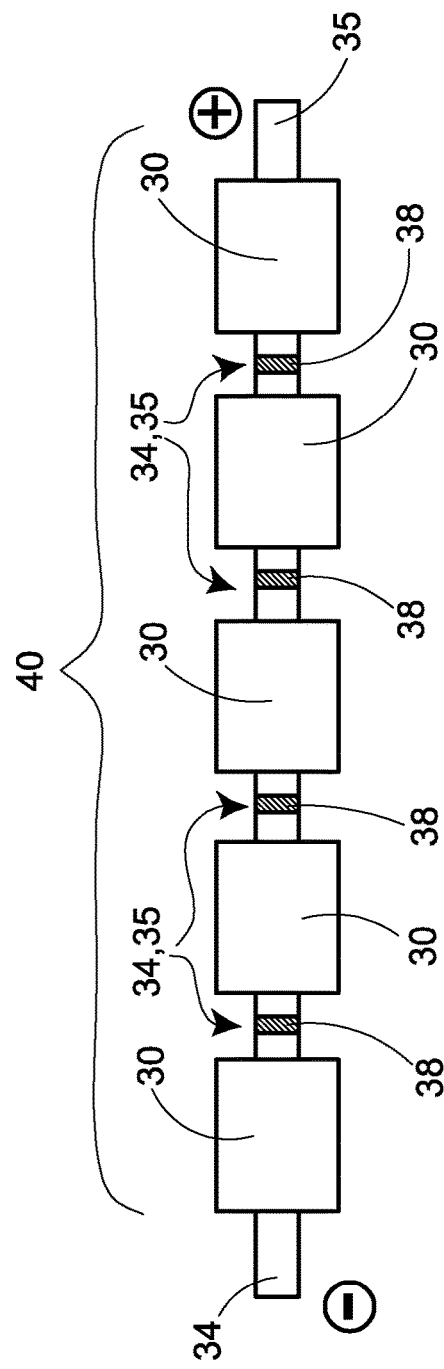

BATTERY PACK, TOOL BATTERY AND BATTERY OPERATED TOOL

CROSS-REFERENCE TO RELATED APPLICATIONS

This application claims priority to U.S. application Ser. No. 14/899,833, filed Dec. 18, 2015, which is a national stage filing under 35 U.S.C. § 371 of International Application No. PCT/CN2014/080868, filed Jun. 26, 2014, which claims priority to Hong Kong Patent Application No. 13107541.4, filed Jun. 26, 2013 and Hong Kong Patent Application No. 13107780.4, filed Jul. 3, 2013. The entire contents of these applications are incorporated herein by reference.

FIELD OF THE INVENTION

The present invention relates to battery packs, and to tool batteries and battery operated tools. In particular, the invention relates to a battery pack suitable for powering a hand held cordless power tool.

BACKGROUND TO THE INVENTION

Power tools and in particular hand held power tools are increasingly relying on cordless rechargeable battery packs as a powering energy source. Such battery packs are preferably compact and lightweight, but must still deliver relatively high current and voltage for powering the tool motor.

SUMMARY OF THE INVENTION

The present invention provides a lithium-polymer based battery pack, a lithium-polymer based tool battery and a lithium-polymer based battery operated tool as set forth in any one of the appended claims.

In particular, in a first aspect of the invention there is provided a lithium-polymer based battery pack for powering a hand held power tool or garden tool, the battery pack comprises a housing selectively connectable to and supportable by a hand held power tool or a garden tool, at least one battery cell located within the housing, the cell having an output voltage of at least 4 volts and producing an average discharge current of greater than 10 amps, wherein the battery cell has a lithium-polymer based chemistry and a nominal charged internal impedance of less than or equal to approximately 10 milliohms. Preferably there is a plurality of battery cells located within the housing, the plurality of cells being interconnected to have a combined output voltage of at least 4 volts and a combined average discharge current of greater than 10 amps, wherein each cell has a lithium-polymer based chemistry and a nominal charged internal impedance of less than or equal to approximately 10 milliohms.

In a second particular aspect of the invention there is provided a lithium-polymer based tool battery comprising a battery housing selectively connectable to and supportable by a hand held power tool or a garden tool, a plurality of substantially flat battery cells stacked within the housing such that each sell is layered with an adjacent cell, and a resiliently deformable substrate located between the adjacent battery cells, wherein each battery cell has a lithium-polymer based chemistry and a nominal charged internal impedance of less than or equal to approximately 10 milliohms.

In a third particular aspect of the invention there is provided a lithium-polymer battery powered tool comprising a tool housing, an electrical motor in the tool housing, a motor controller for controlling power supplied to the motor from an electrical energy source, a battery housing selectively connectable to and supportable by the tool housing, and a battery within the battery housing for supplying power to the motor controller and motor when the battery housing is connected with the power tool housing, the battery comprising one or more battery cells, the cell or cells being having a combined output voltage of at least 4 volts and producing a combined average motor supply current of at least 10 amps, wherein each battery cell has a lithium-polymer based chemistry and a nominal charged internal impedance of less than or equal to approximately 10 milliohms.

Further aspects of the invention will become apparent from the following description which is given by way of example only to illustrate the invention.

DESCRIPTION OF THE DRAWINGS

Various embodiments of the invention will now be described, by way of example only, with reference to the accompanying drawings in which:

FIG. 5 illustrates a string of the five battery cells having terminals welded in series prior to forming into a stack of FIG. 4, FIG. 6 illustrates a stack of five interconnected lithium-polymer based battery cells forming a tool battery according to the invention.

DETAILED DESCRIPTION OF PREFERRED EMBODIMENTS OF THE INVENTION

The following description is given by way of example only to illustrate embodiments of the invention. The terminology used is for illustrative purpose only and is not intended to limit the scope or use of the invention, unless the text clearly and explicitly requires otherwise.

Figure 2:
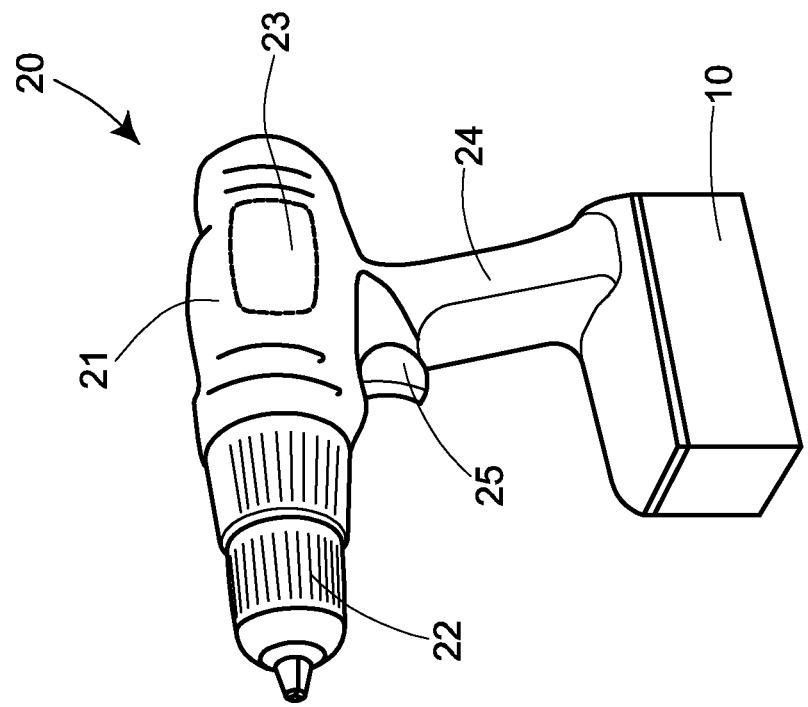
FIG. 2 illustrates a cordless power tool.
Figure 1:
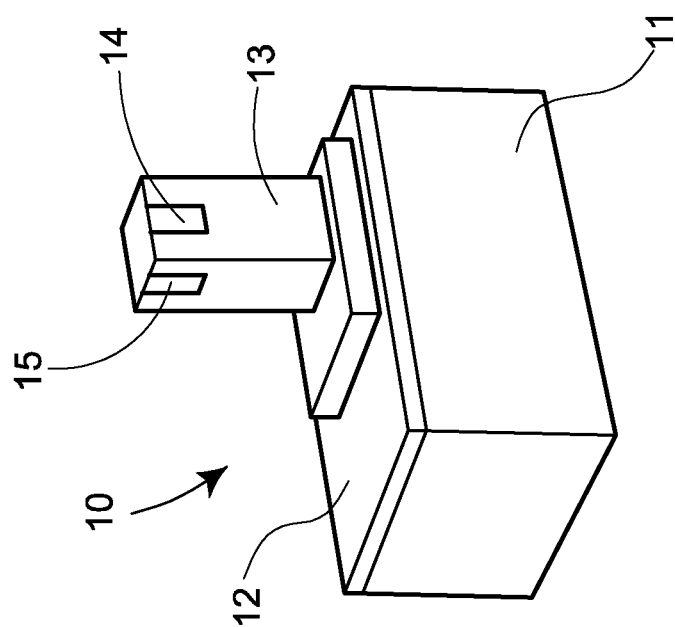
FIG. 1 illustrates a power tool battery.
Figure 3:
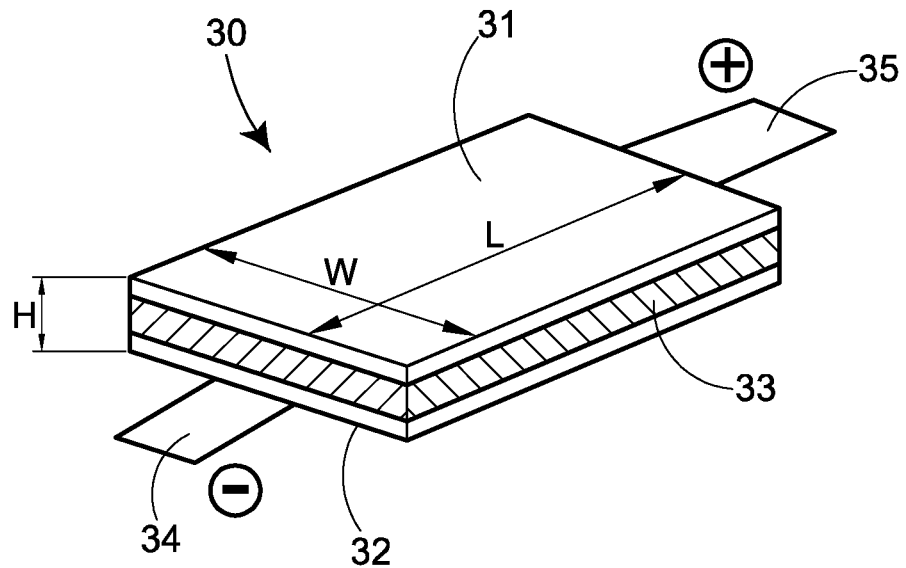
FIG. 3 illustrates a lithium-polymer based battery cell according to the invention.
Figure 4:
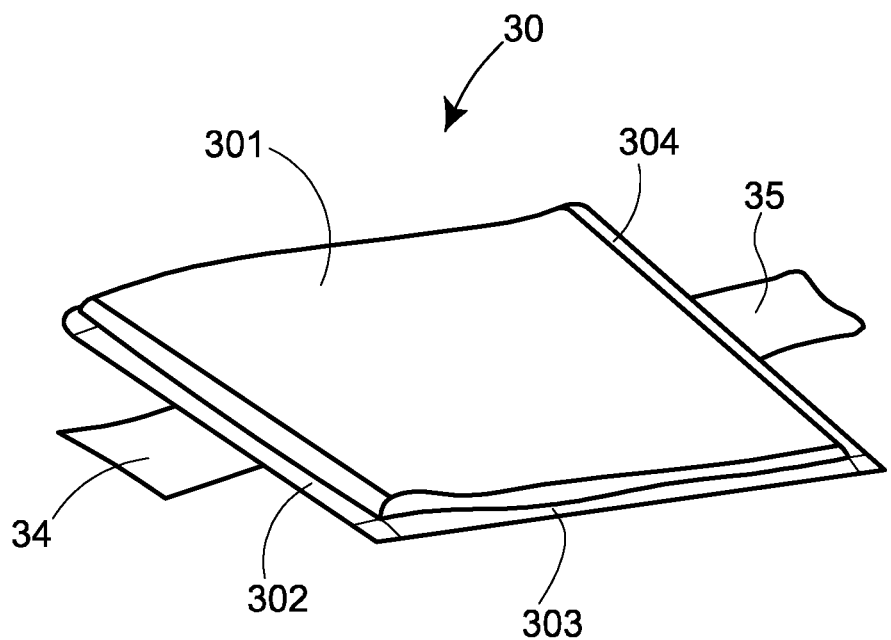
FIG. 4 illustrates a cell pouch for a lithium-polymer based battery.
Figure 8:
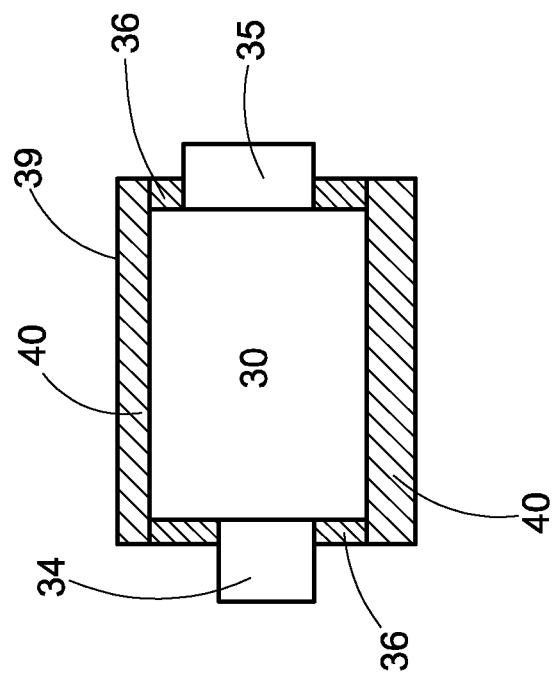
FIG. 8 illustrates a second view of the battery cell and cradle.

FIGS. 1 and 2 illustrate a typical tool battery 10 and a cordless (battery power) tool 20. The illustrated tool 20 is a drill or driver having a tool housing 21 and a pistol type handle 24. A motor 23 (indicated by broken lines) is located within the housing for driving a tool output 22. A battery 10 is connectable to a supported by the tool handle 24. A tool controller such as a trigger 25 is located adjacent the junction between the housing 21 and handle 24 for coupling energy from the battery 10 to the motor 23. This is, however, not intended to limit the scope of use of a battery according to the invention. Such a battery could be used in other types of cordless tools and in particular in hand-held cordless tools or in cordless lawn and garden equipment such as lawn mowers, hedge trimmers and the like. Such a battery could also be used in floor care products such as vacuum cleaners, hand-vacs and cordless sweepers.

A preferred embodiment of a battery for such types of cordless tools has a battery pack housing 11 have a mating face 12 for connecting to the tool. The battery housing 11 is selectively receivable with and supportable by the tool housing via battery connection features, and may be selectively separated from the tool for charging in a separate charger (not shown). One typical embodiment of battery mating features is illustrated in FIG. 1. In the illustrated embodiment the battery connection features are a terminal post 13 and battery terminals 14, 15 on the post 13 for connecting the battery energy sources with the tool controller or trigger 25. In alternative embodiments the battery connection features may be slide-type connection features or any other type of battery connection features known in the art. The type of battery connection features in not an essential feature of the invention.

FIGS. 3 to 11 show details of a battery 40 for location within the battery pack housing 11. The battery 40 comprises a plurality of substantially flat lithium-polymer battery cells 30. Each lithium-polymer cell 30 comprises a first electrode sheet 31 and a second electrode sheet 32 laminated to respective sides of a polymer based separator substrate 33. Connection tabs/tapes 34 and 35 are connected to the respective first and second electrodes sheets 31, 32. The first and second electrode sheets 31, 32 may be any of the lithium-polymer cell anode and cathode combinations known in the art. The polymer separator 33 may be a dry solid polymer electrolyte or porous or micro-porous polymer substrate holding a lithium based electrolyte. The particular anode, cathode and lithium-polymer separator chemistry of the cell is chosen to provide a nominal charged internal cell impedance of less than or equal to approximately 10 milliohms. Each cell 30 may have a typical nominal cell voltage of between 2 volts and 4.2 volt and a nominal amp-hour capacity of greater than 1.5 amp-hours. Each cell is preferably, although not exclusively enclosed in a flexible and lightweight pouch 301. The pouch 301 is formed from, for example, an Aluminum laminate film that is folded around the cell 30 and sealed along the three adjoining sides 302, 303, 304. The connection tabs/tapes 34 and 35 protrude from the pouch between the sealed edges of the film.

A substantially flat cell 30 according the invention has a cell length L, cell width W and cell height or thickness H. In the preferred embodiment the cell thickness H is less than 10% of the cell width W. This provides a substantially flat lithium-polymer cell which can be stacked in interconnected groups, as illustrated in FIGS. 5 to 11 for example, to form a tool battery. For use a tool battery a plurality of the stacked battery cells 30 should have a combined output voltage of at least 4 volts and as high as 40 volts or more. Tool batteries are typically available in stepped voltages of, for example, 4, 9, 12, 18, and as high as 40 volts for some lawn and garden type tools such as lawn mowers. In order to provide sufficient torque in the tool motor the combine average discharge current provide by the plurality of battery cells 30 should be greater than 10 amps, but more preferably 20 amps, although different tools and tool motors will produce different average battery discharge currents.

The tabs 34, 35 from respective ones of the stacked plurality of battery cells 30 are connect together in series and/or parallel in order to provide the required average discharge current and combine output voltage of the battery 40. The connection between the respectively terminal tabs 34, 35 of adjacent cells 30 must be of a lower resistance than the internal resistance of the cells 30 and preferably of a very low resistance so as to prevent heating in the interconnection joint between the cells 30. It is typical in battery manufacturing to interconnect adjacent battery cells by welding respective cell tabs at a weld joint 38. In the preferred embodiment of the invention each battery cell 30 has its respectively pair of tabs 34, 35 on different edges of the cell 30 and preferably on symmetrically opposite edges of the cell 30. This arrangement allows the plurality of cells to be easily interconnected in a string of cells 30 by jointing respective tabs 34, 35 of adjacent cells 30 with a weld joint 38. As the terminal tabs 34, 35 of the cells extend from opposite ends of the cell 30 the weld joint can be quickly and easily formed by a weld between adjacent cells 30 without potential for bridging or shorting adjacent terminal tabs of the same cell which in prior art battery designs may be along a same edge of the cell.

After electrical interconnection of the cell tabs 34, 35 the interconnected cells 30 are formed into a vertical stack of cells 30 as shown in FIG. 6, for example. In a vertical stack of cells each cell 30 is lying over or under an adjacent one of the cells 30. Although in the illustrated embodiment the cells are stacked vertically with reference to the horizontal plane this is for illustrative and descriptive purposes only and the stack of individual cell 30 may be stacked with each cell lying in a vertical, or any other, plane where each cell 30 is layered with an adjacent one of the cells 30. For the purpose of describing the invention, stacked means each cell lying in adjacent parallel planes. During charge and discharges cycles of the battery the thickness H of each cell 30 may very normally by up to 5% of the cell thickness H. In order to accommodate this variation in cell thickness during charge and discharges cycles the cell stack includes a resiliently deformable substrate 37 interposed between each adjacent battery cell 30. The thickness of the resiliently deformable substrates 37, and thus the distance between adjacent cells, is preferably between 5% and 10% of the normal cell thickness H in order to accommodate for variation in individual cell thickness up to 5%. In some embodiments the resiliently deformable substrate 37 between cells 30 may be provided with a thermally conductive characteristic for conducting heat away from the cells during charge and discharge cycles. For example, the substrate may be resiliently deformable and thermally conductive, or the substrate may be porous, such as a spongy material, and impregnated with a thermally conductive substance.

The cell interconnection tabs 34, 35 extended between adjacent stacked cells 30. To support and protect the interconnection tabs 34, 35 from mechanical damage in some embodiments of the invention a guide member 36 is provided at respective locations adjacent the edge of the stacked cells 30 to abut the interconnected tabs 34, 35 between adjacent cells 30. The guide member 36 has a convex guiding surface that abuts the joined tabs 34, 35 extending between the adjacent cells and supports the joined tabs about a smooth radius between the adjacent cells 30.

Figure 7:
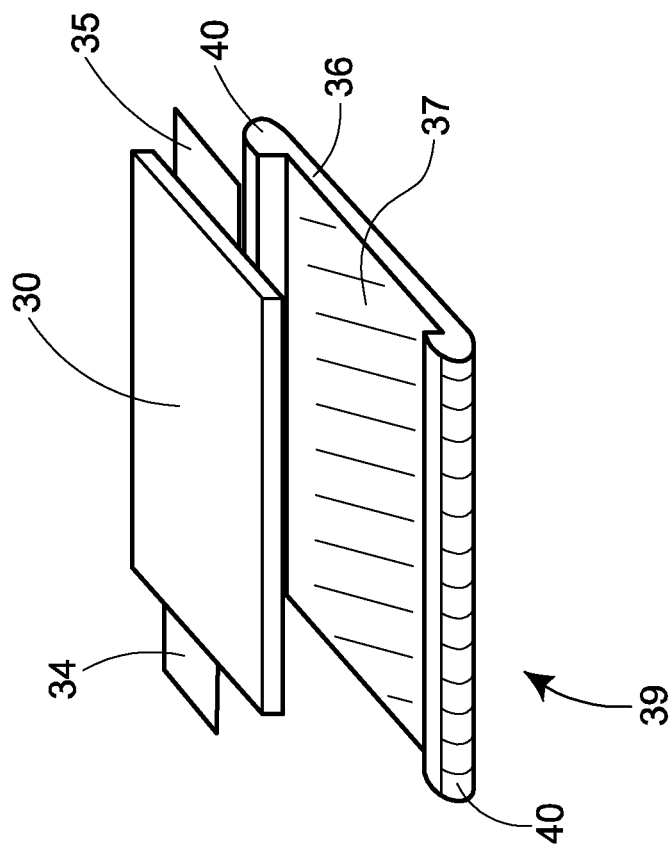
FIG. 7 illustrates a battery cell according to the invention and a resiliently deformable cradle for the battery cell.
Figure 9:
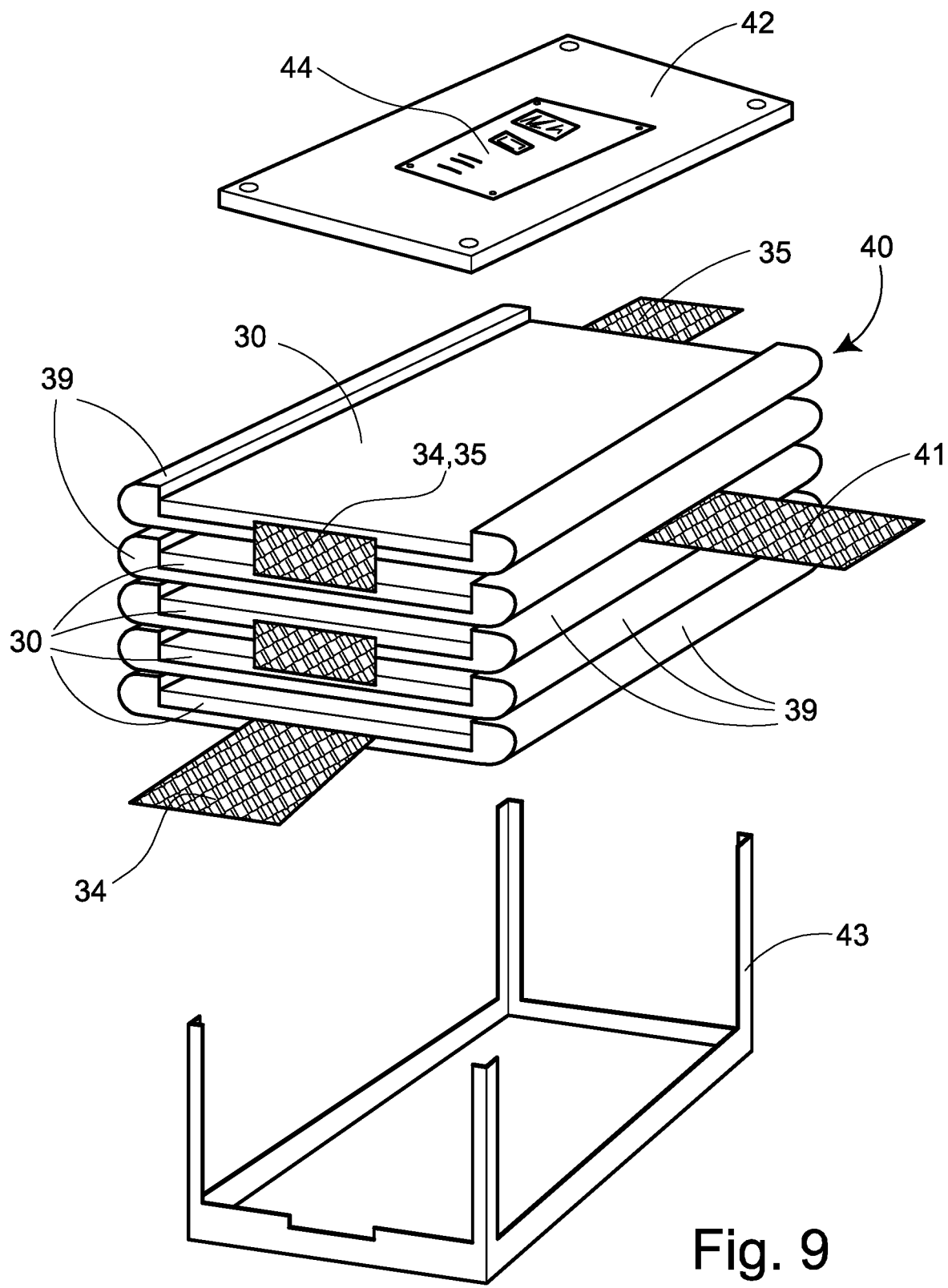
FIG. 9 illustrates an exploded view of a battery comprising a polarity of lithium-polymer battery cells.

The interconnected stack of cells 30 forming battery 40 is located within a battery pack housing such as housing 11 of the battery of FIG. 1. It will be appreciated by a skilled person that the battery 40 constructed of pouch cells must be physically and mechanically supported within the battery housing 11 against mechanical vibrations and shocks that might be experienced during use of the tool to which a battery pack 10 is connected. FIGS. 6 to 10 show a cradle and shell arrangement for mechanically supporting a stack of battery cells 30 within the battery housing 11 in some embodiments. FIG. 7 shows an individual battery cradle 39 for supporting a substantially flat lithium-polymer battery cell 30. The cradle 39 is a flat substrate of resiliently deformable material such as EVA foam or the like and has a wide cell-channel extending through one face of the substrate. An individual battery cell 30 locates within the cell-channel for support by the cradle. The cradle 39 has side edges 40 to provide mechanical protection for the sides of the battery cell 30 and integrally combines the resiliently deformable cell spacer substrate 37, below the cell-channel, and cell tab guide 36 into a single protective cradle for an individual battery cell 30. FIG. 9 shows a stack of battery cells 30 each held within its own individual resiliently deformable cradle 39. The cradled stack of battery cell 30 locates within a cradle frame 43 and is fitted with a cover 42 in order to mechanically hold the stack of battery cells 30 together. A printed circuit board assembly (PCBA) 44 can optionally be attached to or incorporated with the cover 42. The PCBA can contain battery pack electronics and protection circuits. The cradle frame 43 supporting the battery 40 is located within a battery housing 11. The cradles 39 and cradle frame 42, 43 are preferably a "friction fit" within the battery housing 11 such that the battery 40 is mechanically supported against and variations and shocks experienced during use of the battery on a power tool.

Figure 10:
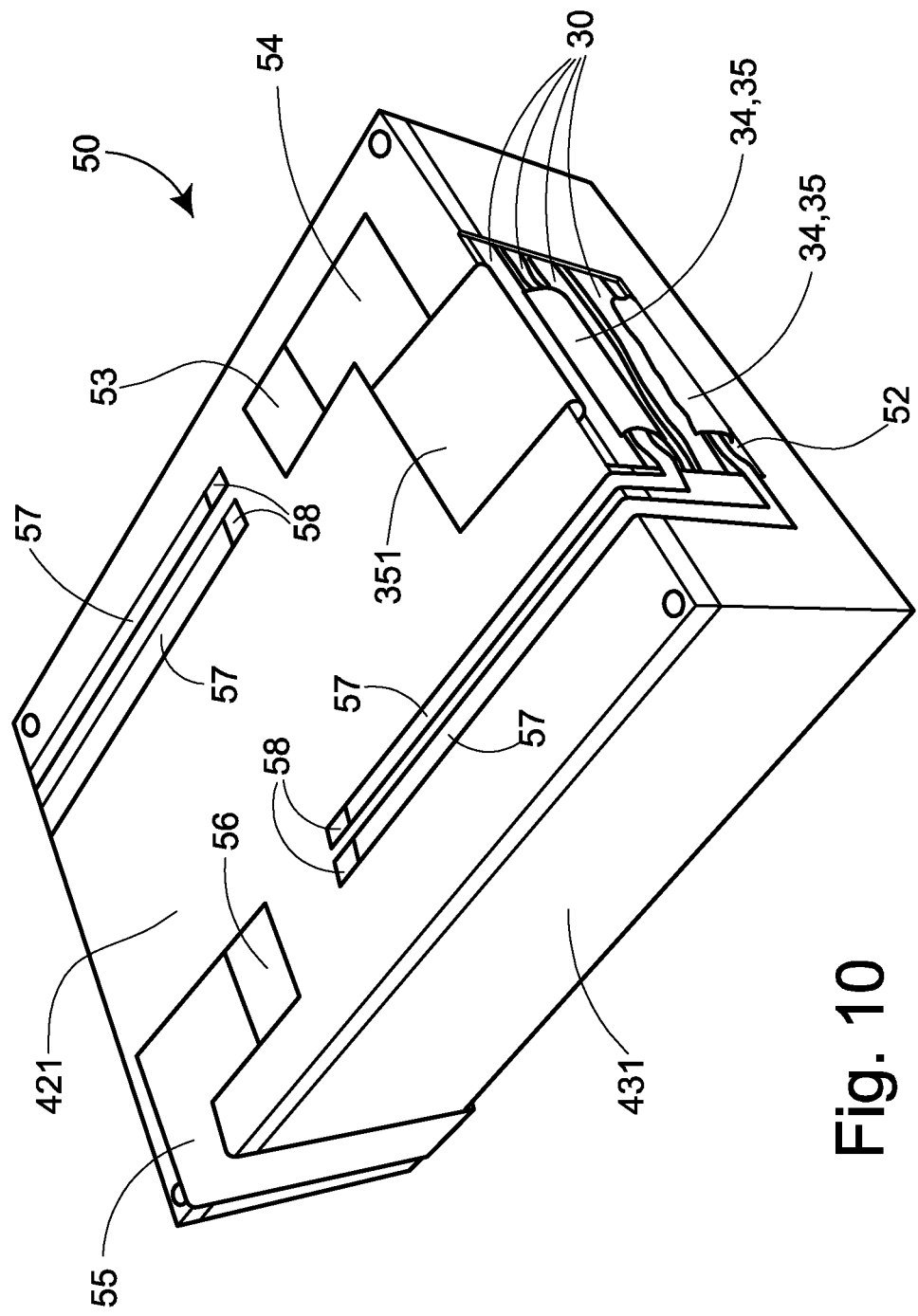
FIG. 10 illustrates a first perspective view of a battery case for a lithium-polymer based battery according to the invention.
Figure 11:
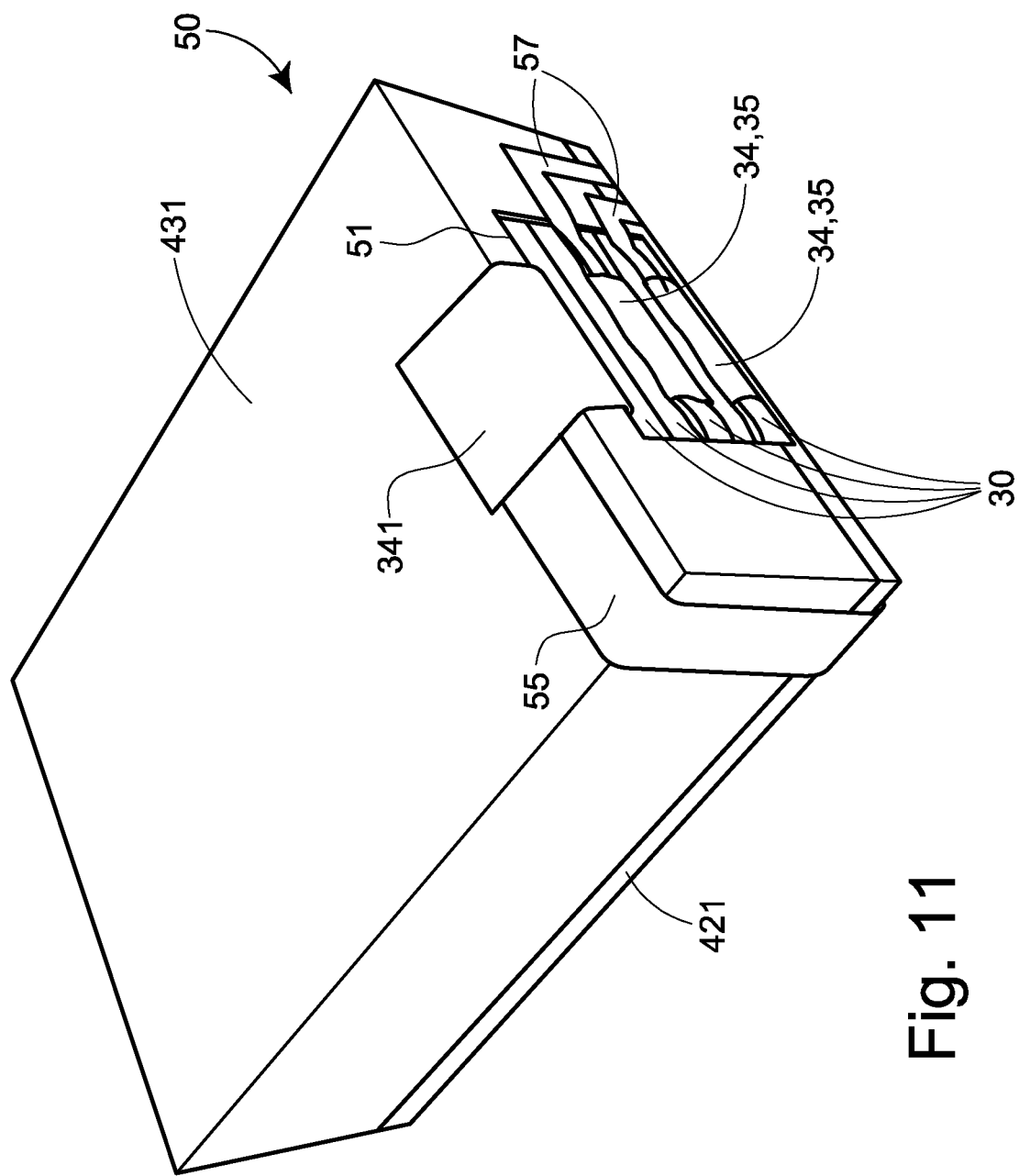
FIG. 11 illustrates a second perspective view of the battery case for a lithium-polymer based battery according to the invention.
Figure 12:
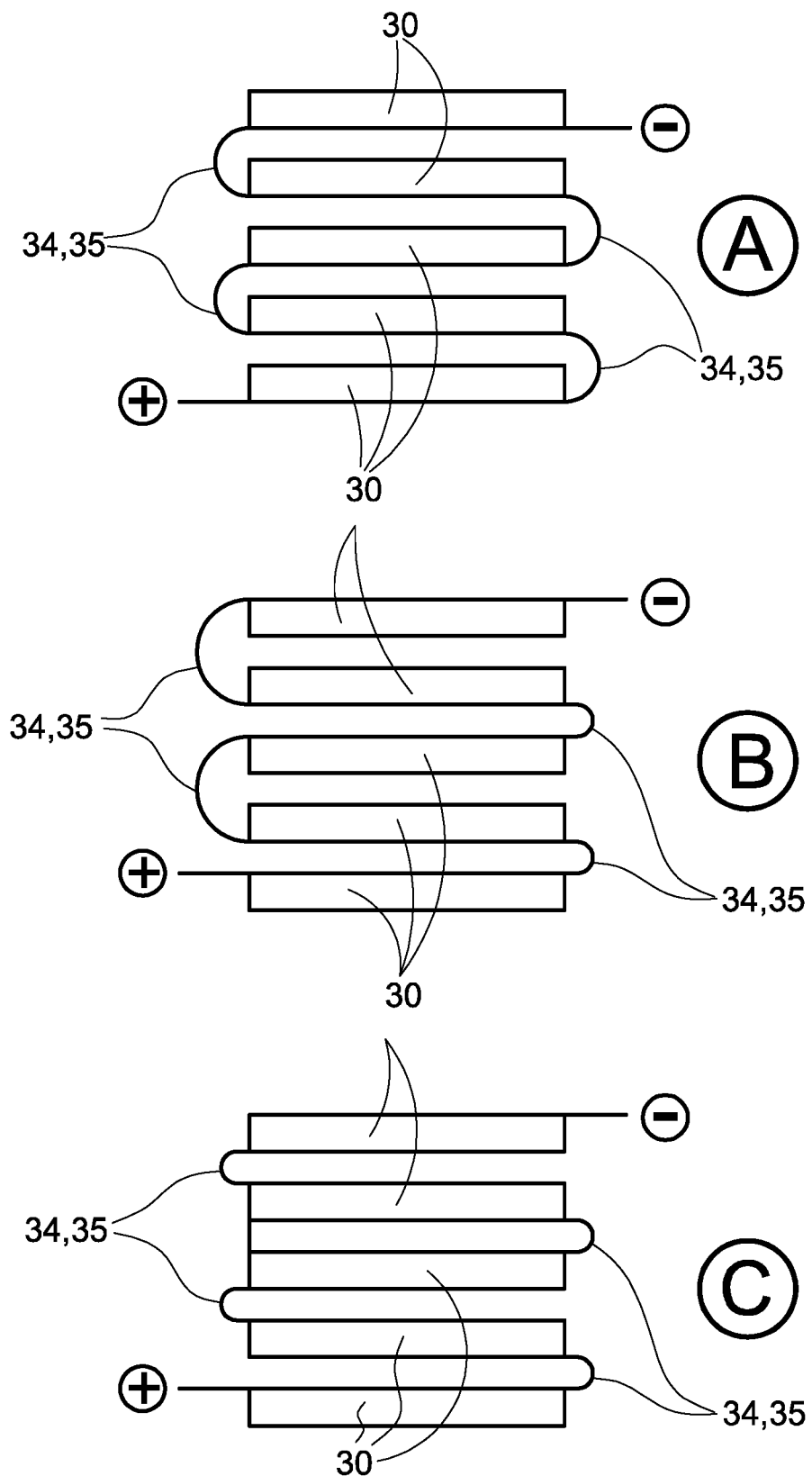
FIG. 12 illustrates different connection arrangements for a stack of lithium-polymer battery cells.

In some embodiments further mechanical protection of the pouch cell battery is provided by enclosing the stack of battery cells 30 within a shell or case 50 as shown in FIGS. 10 and 11. The case 50 comprises a case enclosure 431 having a base and four surrounding side walls defining a cavity into which the stacked battery cells 30 are located. A cover 421 is fixed to the tops of the four surrounding side walls to enclose the cavity and stacked battery cells 30. An opening 51, 52 is provided in each of the opposed end side walls of the case enclosure 431 to allow space for and accommodate connection access to the interconnected terminal tabs 34, 35 of adjacent cells 30. The free end terminal tabs 341 and 251 of the stack of cells 30 pass though respective end openings 51, 52 and are folded through substantially 180-degrees to lie substantially flat with respective upper and lower surfaces of the case 50. The first free terminal tab 351 of the stacked cells 30 is folded back against a first surface of the case 50 and electrically connected with one end of a conductive lead strap 54. The second end of the first conductive lead strap 54 has a first exposed connection terminal 53 of copper or other electrically conductive terminal material. The conductive lead strap 54 is preferably a copper strap having an insulated coating such as a polyurethane insulating varnish. The terminal end 53 of the strap is free of the insulating varnish to allow for electrical connection to the strap. The second free terminal tab 341 of the stacked cells 30 is folded back against the second opposite surface of the case 50 and electrically connected with one end of a second conductive lead strap 55. The second conductive lead strap 55 extends flat with the case surface around the side of the case to the first surface of the case 50 where it is provided with a second exposed connection terminal 56 of copper or other electrically conductive terminal material. The second conductive lead strap 55 is preferably a copper strap having an insulated coating such as a polyurethane insulating varnish. The terminal end 56 of the strap is free of the insulating varnish to allow for electrical connection to the strap. In some embodiments auxiliary conductive straps 57 of a type the same or similar to first and second conductive straps 54, 55 are provided for providing addition signal connections to the stack of cells 30. For example, auxiliary conductive straps 57 are preferably provided for each of the interconnected terminal tabs 34, 35 between stacked cells for providing means for measuring individual cell voltages. Each auxiliary conductive strap 57 has a connection terminal 58 at its distal end. Auxiliary conductive straps 57 may also be provided to temperature and other sensors associated with the stack of cells 30. A printed circuit board assembly (PCBA) can optionally be attached to or incorporated with the enclosure cover 421 or within the case 50. The PCBA can contain battery pack electronics and protection circuits.

Within some embodiment a small PCBA is attached to the tabs 34, 35 of the battery cells. Such a PCBA can comprises a sensor for transmitting a voltage dependent sensor signal to the battery controller 44, or a battery charger controller for determining cell voltages for using in, for example, cell balancing operations. In a further embodiment of the invention one or more sensor elements can be located between adjacent cells for measuring temperature and other cell characteristics. In one embodiment a pressure sensor is provided between adjacent cells for detecting expansion in cell thickness during charge and discharge cycles. If pressure or deformation of the substrate between adjacent cells exceeds a threshold this may indicate an abnormal and possibly dangerous cell condition. Signals from such sensors are transmitted to the battery controller 44, or a battery charger controller.

Traditional lithium ion cells used in tool batteries are mechanically contained in a strong cylindrical metal can. These cans are grouped together to form a battery and located in a battery pack housing. The interior of the housing has a first housing volume and the grouped cell cans defines a combined battery volume. The fill-factor of a cylindrical body in a substantially square or rectangular housing is at best Pi divided by 4 (Π/4) or 78%. The stacked flat cells of the present invention provides a ratio of the combined battery volume to housing volume (fill ration) of greater than 80%, allowing for a smaller more light weight battery.

In the various embodiments described above the battery comprises a plurality of interconnected cells. In at least one alternative embodiment the battery may comprises just one lithium polymer based chemistry cell. In other alternative embodiment the battery may comprises between 2 and 20 interconnected cells, or more preferably between 2 and 10 interconnected cells. In yet another embodiment the battery may comprises between 3 and 5 cells interconnected in series. In the various embodiments the cells may be interconnected in series, in parallel, or groups of series cells may be interconnected in parallel in order to obtain a desired output voltage and combined average discharge current.

What is claimed is:
1. A lithium-polymer based battery pack for powering a hand held power tool or a garden tool, the battery pack comprising:
   a housing selectively connectable to and supportable by a hand held power tool or a garden tool; and
   a plurality of battery cells located within the housing, the plurality of cells being interconnected to have a combined nominal output voltage of at least 4 volts and being capable to produce an average discharge current of greater than 10 amps, wherein each battery cell has a lithium-polymer based chemistry and a nominal charged internal impedance of less than or equal to approximately 10 milliohms, wherein each of the plurality of battery cells is supported within the housing in a resiliently deformable cradle surrounding at least a part of each battery cell, wherein each resiliently deformable cradle includes side edges so as to provide mechanical protection for sides of each of the plurality of battery cells, wherein a cradle frame fitted with a cover is arranged to hold a stack of the plurality of battery cells, each of the plurality of battery cells held within its own respective resiliently deformable cradle, wherein the cradle frame fits within the housing, wherein the cradle frame is a case enclosure having a base and four surrounding side walls defining a cavity for holding the stack of the plurality of battery cells, wherein an opening is provided in each of two opposed side walls of the four surrounding side walls of the case enclosure to allow space for and accommodate connection access to a plurality of terminal tabs connecting the plurality of battery cells within the case enclosure, and wherein each of the plurality of terminal tabs are provided with an exposed connection terminal disposed on a surface of the cover.

2. The lithium-polymer based battery pack of claim 1, wherein each battery cell is located and supported within a cell channel defined through a face on the respective resiliently deformable cradle.

3. The lithium-polymer based battery pack of claim 1 wherein each of the battery cells includes an anode electrode sheet, a cathode electrode sheet, and a lithium-polymer based substrate located between the anode and cathode electrode sheets, and wherein each of the battery cells is generally flat and has a cell width and a cell thickness, the cell thickness being less than 15% of the cell width.

4. The lithium-polymer based battery pack of claim 1, wherein the plurality of battery cells are layered within the housing such that each battery cell is lying adjacent to another one of the battery cells, and further including a resiliently deformable substrate between the adjacent battery cells.

5. The lithium-polymer based battery pack of claim 4, wherein the resiliently deformable substrate defines the resiliently deformable cradle, and wherein the side edges of the resiliently deformable cradle integrally combine with the resiliently deformable substrate.

6. The lithium-polymer based battery pack of claim 5, wherein the resiliently deformable substrate is thermally conductive, wherein the lithium-polymer based battery pack includes at least one sensor element located between at least two adjacent ones of the battery cells, said sensor element providing a sensor signal to a battery controller, and wherein the sensor element includes a temperature sensor.

7. The lithium-polymer based battery pack of claim 4, wherein a pressure sensing element is located between at least two adjacent ones of the battery cells, the pressure sensing element configured to provide a pressure sensor signal to a battery controller.

8. The lithium-polymer based battery pack of claim 1, wherein the housing defines a housing volume and the plurality of battery cells provides a combined battery volume, and wherein a ratio of the combined battery volume to the housing volume is greater than 80%.

9. The lithium-polymer based battery pack of claim 1, wherein each of the battery cells includes a first connection lead connected with an anode electrode sheet of the battery cell and a second connection lead connected with a cathode electrode sheet of the battery cell, the first connection lead extending from a first edge of the battery cell and the second connection lead extending from a second edge of the battery cell, the second edge being a different edge than the first edge.

10. The lithium-polymer based battery pack of claim 9, wherein the plurality of battery cells are stacked vertically within the housing such that each battery cell is layered with another adjacent battery cell, wherein at least one of the first and second connection leads are joined with a connection lead of an adjacent battery cell.

11. The lithium-polymer based battery pack of claim 1, further including a guide member having a convex guiding surface abutting the joined connection leads extending between adjacent battery cells.

12. The lithium-polymer based battery pack of claim 1, wherein each resiliently deformable cradle includes two or more resiliently deformable members each abutting at least one respective battery cell.

13. A lithium-polymer based battery pack for powering a hand held power tool or a garden tool, the battery pack comprising:

a housing selectively connectable to and supportable by a hand held power tool or a garden tool;

a plurality of battery cells located within the housing;

a plurality of resiliently deformable cradles, each resiliently deformable cradle surrounding and supporting at least a part of each battery cell, wherein each resiliently deformable cradle includes side edges, and wherein each resiliently deformable cradle further includes an integrally formed guide member having a convex guiding surface abutting a terminal tab included in a plurality of terminal tabs connecting the plurality of battery cells within the case enclosure; and a cradle frame configured to hold the plurality of battery cells within the housing, each of the plurality of battery cells supported by its respective resiliently deformable cradle, wherein the cradle frame is fitted with a cover.

14. The lithium-polymer based battery pack of claim 13, further comprising:

a printed circuit board assembly attached to the cover, the printed circuit board assembly containing electronics for controlling the lithium-polymer based battery pack.

15. The lithium-polymer based battery pack of claim 13, wherein the plurality of battery cells are layered within the housing such that each battery cell is lying adjacent to another one of the battery cells, and further including a resiliently deformable substrate between the adjacent battery cells.

16. The lithium-polymer based battery pack of claim 15, wherein each resiliently deformable cradle integrally combines with a respective resiliently deformable substrate.

17. The lithium-polymer based battery pack of claim 13, wherein each of the battery cells includes a first connection lead connected with an anode electrode sheet of the battery cell and a second connection lead connected with a cathode electrode sheet of the battery cell.

18. The lithium-polymer based battery pack of claim 17, wherein the plurality of battery cells are stacked vertically within the housing such that each battery cell is layered with another adjacent battery cell, wherein at least one of the first and second connection leads are joined with a connection lead of an adjacent battery cell.

19. The lithium-polymer based battery pack of claim 13, wherein each resiliently deformable cradle includes two or more resiliently deformable members each abutting at least one respective battery cell.

20. A lithium-polymer based battery pack for powering a hand held power tool or a garden tool, the battery pack comprising:
   a housing selectively connectable to and supportable by a hand held power tool or a garden tool; and
   a plurality of battery cells located within the housing, the plurality of cells being interconnected to have a combined nominal output voltage of at least 4 volts and being capable to produce an average discharge current of greater than 10 amps, wherein each battery cell has a lithium-polymer based chemistry and a nominal charged internal impedance of less than or equal to approximately 10 milliohms,
   wherein each of the plurality of battery cells is supported within the housing in a resiliently deformable cradle surrounding at least a part of each battery cell, wherein each resiliently deformable cradle includes side edges so as to provide mechanical protection for sides of each of the plurality of battery cells,
   wherein each resiliently deformable cradle further includes an integrally formed guide member having a convex guiding surface abutting a terminal tab included in a plurality of terminal tabs connecting the plurality of battery cells within the case enclosure,
   wherein a cradle frame fitted with a cover is arranged to hold a stack of the plurality of battery cells, each of the plurality of battery cells held within its own respective resiliently deformable cradle,
   wherein the cradle frame fits within the housing,
   wherein the cradle frame is a case enclosure having a base and four surrounding side walls defining a cavity for holding the stack of the plurality of battery cells,
   wherein an opening is provided in each of two opposed side walls of the four surrounding side walls of the case enclosure to allow space for and accommodate connection access to the plurality of terminal tabs, and
   wherein each of the plurality of terminal tabs are provided with an exposed connection terminal disposed on a surface of the cover.

* * * * *